Patented Feb. 4, 1936

2,029,727

UNITED STATES PATENT OFFICE 2,029,727

SYMMETRICAL DI-(ARYLAMINO)-HYDROXYBENZENES AND A PROCESS OF PREPARING THEM

Leopold Laska and Oskar Haller, Offenbach-on-the-Main, Germany, assignors to General Aniline Works, Inc., New York, N. Y., a corporation of Delaware No Drawing. Application August 25, 1933, Serial No. 686,852. In Germany September 3, 1932

8 Claims. (Cl. 260—128)

The present invention relates to symmetrical di-(arylamino)-hydroxybenzenes and to a process of preparing them.

We have found that symmetrical di-(arylamino)-hydroxybenzenes are obtainable by heating in an aqueous solution phloroglucine with alkali metal bisulfites and non-nitrated arylamines in the proportion of about two mols of arylamine to one mol. of phloroglucine.

The condensation of phloroglucine with aniline or paratoluidine has already been described by Minunni (cf. "Berichte der deutschen chemischen Gesellschaft", vol. 21 (1888), pages 1984 to 1991 and vol. 23 (1890), Referateband, pages 488 to 490). But Minunni himself states that by this known process the condensation products are obtained with a yield up to only 40% of the theoretical whereas, according to the present process, the condensation products are obtained with a yield of above 90% of the theoretical amount. The smooth course of the condensation of arylamines with phloroglucine in the presence of bisulfites and the formation of 1,3,5-di-(arylamino)-hydroxybenzenes could not be foreseen, since the bisulfite additive compounds of phloroglucine which are obtained as intermediates during the conversion, see Fuchs, "Berichte der deutschen chemischen Gesellschaft", vol. 54 (1921) pages 245 et seq., are very stable to caustic potash solution or are only uncompletely saponified and it, therefore, was uncertain whether at all they might react with arylamines. The condensation of phloroglucine in the presence of bisulfite may be effected with aniline, its homologues and substitution products, for instance, chloranilines, anisidines, etc.

The condensation products obtained which represent 1,3,5-diarylaminophenols possess according to their constitution in the form of their alkali salts a more or less great affinity for the vegetable fiber and are valuable intermediate products for the preparation of dyestuffs. Those among them which are new products, are characterized by the following general formula:

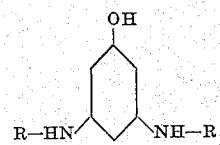

wherein R represents a radical of the naphthalene series or a benzene nucleus which is substituted by halogen, alkoxy, amino groups or in o- or m-position to the imino group by alkyl.

The following examples serve to illustrate the invention, but they are not intended to limit it thereto; the parts are by weight:

(1) 162 parts of phloroglucine (containing water of crystallization), 186 parts of aniline and 1000 parts of sodium bisulfite solution (containing 37.6% of sodium bisulfite) are heated to boiling for 50 hours, while stirring. After addition of caustic soda solution, any unchanged aniline is blown off by means of steam and the reaction mixture is allowed to cool; in order to purify the precipitate thus formed it is filtered with suction, dissolved again in dilute caustic soda solution, filtered and precipitated by addition of a mineral acid until a neutral solution is obtained. The diphenyl-diamino-hydroxybenzene, which is obtained with a yield of 90% of the theoretical, melts after recrystallization from toluene at 110° C. and is identical with the product obtained by Minunni.

The 1,3,5-di-(p-chlorphenylamino)-hydroxybenzene, obtained in a corresponding manner by condensation of phloroglucine with p-chloraniline in a yield of 90% of the theoretical, melts at 112° C. and possesses in alkaline solution a remarkable affinity for the vegetable fiber. 1,3,5-di-(p-methoxyphenylamino)-hydroxybenzene is obtained in a yield of 95% of the theoretical and melts at 155° C. 1,3,5-di-(m-tolylamino)-hydroxybenzene melts at 108° C. and the corresponding condensation product of phloroglucine and beta-naphthylamine melts at 165° C.

(2) 162 parts of phloroglucine (containing water of crystallization), 214 parts of p-toluidine and 1000 parts of sodium bisulfite solution (containing 37.6% of sodium bisulfite) are heated in an enamelled pressure vessel for 15 hours to 120° C., while stirring. After addition of caustic soda solution until alkalinity, any unchanged p-toluidine is blown off by means of steam and the solution is filtered; the 1,3,5-di-(p-tolylamino)-hydroxybenzene is precipitated by addition of hydrochloric acid. In order to purify the precipitate, it is again dissolved in caustic soda solution and precipitated by addition of hydrochloric acid. It crystallizes from xylene and melts at 121° C.

(3) 162 parts of phloroglucine (containing water of crystallization), 262 parts of 1-methoxy-2-methyl-4-amino-benzene and 1000 parts of sodium bisulfite solution (containing 37.6% of sodium bisulfite) are heated to boiling for 50 hours, while stirring. After addition of caustic soda solution, any unchanged base is blown off by means of steam and the solution is filtered; the 1,3,5-di-(4'-methoxy-3'-methyl-phenylamino)-hydroxybenzene is precipitated in the form of a yellow dihydrochloride by addition of hydrochloric acid until an acid reaction is obtained.

In the same manner the 1,3,5-di-(4'-methoxy-2'-methyl-phenylamino)-hydroxy-benzene is obtained from phloroglucine and 1-methoxy-3-methyl-4-aminobenzene in the form of a yellow dihydrochloride.

(4) 81 parts of phloroglucine (containing water of crystallization), 213.5 parts of the hydrochloride of 2,5-dichloro-para-phenylenediamine and 1000 parts of sodium bisulfite solution (containing 37.6% of sodium bisulfite) are heated to boiling for 50 hours, while stirring. The 1,3,5-di-(4'-amino-2,5'-dichlorphenylamino)-hydroxybenzene thus formed is filtered with suction, while cold, extracted with hydrochloric acid in order to remove any unchanged diamine, washed until neutral and dried. It crystallizes from anisole and melts at 167° C.

In a similar manner phloroglucine may be condensed with other non-nitrated arylamines, for instance, with ortho-toluidine or alpha-naphthylamine. By a suitable working method there are obtained 1,3,5-di-(m-xylylamino)-hydroxybenzene from m-xylidine ($CH_3:CH_3:NH_2=1:3:4$) and 1,3,5-di-(3',4'-dichlorphenylamino)-hydroxybenzene from 3,4-dichloraniline.

We claim:

1. The process which comprises heating in aqueous solution phloroglucine with alkali metal bisulfites and non-nitrated arylamines of the benzene and naphthalene series in the proportion of about two mols of arylamine to one mol. of phloroglucine.

2. The process which comprises heating under pressure in aqueous solution phloroglucine with alkali metal bisulfites and non-nitrated arylamines of the benzene and naphthalene series in the proportion of about two mols of arylamine to one mol. of phloroglucine.

3. The process which comprises heating in aqueous solution phloroglucine with alkali metal bisulfites and chlorinated aminobenzenes in the proportion of about two mols of chlorinated aminobenzenes to one mol of phloroglucine.

4. The process which comprises heating to boiling phloroglucine with sodium bisulfite solution containing 37.6% of sodium bisulfite and p-chloroaniline in the proportion of two mols of p-chloroaniline to one mol. of phloroglucine.

5. The compounds of the following general formula

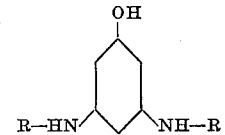

wherein R represents a radical of the naphthalene series or a benzene nucleus which is substituted by halogen, alkoxy or amino groups, being crystallized compounds which have in form of their alkali salts a good affinity for the vegetable fiber.

6. The compounds of the following general formula

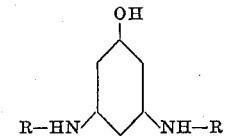

wherein R represents a benzene nucleus which is substituted by halogen, being crystallized compounds which have in form of their alkali salts a good affinity for the vegetable fiber.

7. The compound of the following formula:

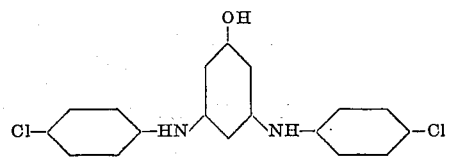

being a crystallized compound which melts at 112° C. and has in form of its alkali salts a good affinity for the vegetable fiber.

8. The compound of the following formula:

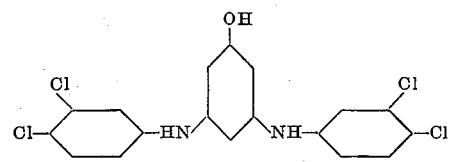

being a crystallized compound which has in form of its alkali salts a good affinity for the vegetable fiber.

LEOPOLD LASKA.
OSKAR HALLER.